US005302660A

United States Patent [19]

Klinksiek et al.

[11] Patent Number: 5,302,660

[45] Date of Patent: Apr. 12, 1994

[54] PROCESS FOR THE PRODUCTION OF VISCOSITY-STABLE, LOW-GEL HIGHLY CONCENTRATED ELASTANE SPINNING SOLUTIONS

[75] Inventors: Bernd Klinksiek, Bergisch Gladbach; Rolf-Volker Meyer, Krefeld-Bockum; Beatrix Frauendorf, Leverkusen; Klaus Rall, K ln; Wolfgang 35e,uml/a/ cker, Pulheim; Hans-Joachim Wollweber, Krefeld; Helmut Ohse; Wolfram Wagner, both of Dormagen, all of Fed. Rep. of Germany

[73] Assignee: Bayer Aktiengesellschaft, Fed. Rep. of Germany

[21] Appl. No.: 87,978

[22] Filed: Jul. 7, 1993

[30] Foreign Application Priority Data

Jul. 10, 1992 [DE] Fed. Rep. of Germany ....... 4222772

[51] Int. Cl.$^5$ .............................................. C08L 75/04

[52] U.S. Cl. .................................... 524/871; 524/726; 528/61; 528/64; 422/131; 422/133; 422/134; 422/135

[58] Field of Search .................. 524/871, 726; 528/61, 528/64; 422/131, 133, 134, 135; 521/917

[56] References Cited

U.S. PATENT DOCUMENTS 4,526,907 7/1985 Thiele et al. ........................ 521/917

*Primary Examiner*—Maurice J. Welsh

*Attorney, Agent, or Firm*—Connolly & Hutz

[57] ABSTRACT

The invention relates to a process for the production of low-gel spinning solutions-surprisingly stable in their solution viscosity-of segmented polyurethane urea elastomers in highly polar solvents, such as dimethyl formamide or dimethyl acetamide, characterized by the use of multistage jet reactor, and to a multistage jet reactor.

13 Claims, 3 Drawing Sheets

PROCESS FOR THE PRODUCTION OF VISCOSITY-STABLE, LOW-GEL HIGHLY CONCENTRATED ELASTANE SPINNING SOLUTIONS

This invention relates to a process for the production of spinning solutions-surprisingly stable in their solution viscosity-of segmented polyurethane urea elastomers in highly polar solvents, such as dimethyl formamide (DMF) or dimethyl acetamide (DMAC), with a reduced tendency, if any, towards paste formation and with a very small, if any, gel content, characterized by the use of a multistage jet reactor for carrying out the process.

The present invention also relates to a multistage jet reactor with no mechanically moving parts as an apparatus which, through very rapid and intensive mixing of the reaction components with one another, enables segmented polyurethane urea elastomers, for example, to be continuously produced in the form of homogeneous solutions in highly polar solvents.

The present invention also relates to the elastane spinning solutions obtainable by the process and the reactor and to elastane fibers obtainable from these spinning solutions.

Elastane fibers are filaments of which at least 85% by weight consist of polyurethane (urea)s. Elastane fibers are normally produced by initially endcapping a long-chain diol (macrodiol) with an aromatic diisocyanate so that a macrodiisocyanate (NCO prepolymer) is obtained. The NCO prepolymer is then reacted in a second step with a chain-extending agent, which normally consists of a (cyclo)aliphatic diamine, in solution to form a high molecular weight polyurethane urea. These polyurethane ureas are synthesized in such a way that the macromolecule has a segment structure, i.e. consists of high-melting crystalline segments and low-melting amorphous segments (hard and soft segments, respectively). By virtue of their crystallinity, the hard segments act as fixed points of the network in the solid and are therefore crucial to the strength and to the softening range of the solids produced from the polymer. By contrast, the soft segments, of which the glass transition temperature should be below the service temperature, are crucial to the elasticity of the elastomers (B. v. Falkai, Synthesefasern, Verlag Chemie, 1981, pages 179 to 187).

The chain-extending step is normally carried out discontinuously by initially introducing the chain extender (an aliphatic diamine, preferably ethylene diamine) and optionally a chain terminator, a secondary monoamine, such as diethyl amine for example, in a polar solvent (DMF or DMAC) into a stirred tank reactor at reduced temperature and preferably adding carbon dioxide. The NCO prepolymer is then added to this suspension of the intermediate diamine carbamate (preferably obtained by addition of $CO_2$ and thereby reduced in its reactivity). An elastomer solution having a defined elastomer solids content is then formed with stirring. One disadvantage of this method of production is that the desired viscosity of the elastane solutions is often not in the intended range which is required for subsequent processing and which therefore has to be adjusted to the required value, for example by addition of aliphatic diisocyanates. Another disadvantage is that parts of the solution become paste-like and/or gel particles are present unless the solution was adequately mixed. Elastane solutions such as these cannot be subsequently processed in a practicable manner. Because of the inadequate intensity of mixing, solutions which have been discontinuously produced would appear to contain more highly branched polyurethane ureas which, at a given concentration, have higher viscosities than less branched or linear polyurethane ureas.

To improve economy (high-speed spinning) and for ecological reasons (reducing the solvent content of the elastane spinning solution), the elastane spinning solutions should have high solids concentrations of $\geqq 30\%$. However, with solids concentrations as high as these, particular problems arise in the form of limited solubility of the polymers, particularly in the event of prolonged storage of the spinning solutions, which is reflected in paste formation or in an increase in viscosity. In many cases, the effect of this decrease in solubility is that the elastane solution cannot be subsequently processed or spun. There are various reasons for these phenomena.

In the case of highly concentrated elastane solutions, the following factors for example can lead to the reduction in solubility:

1. The lower the solvent content, the more rapid the desolvation of the soft segments consisting of high molecular weight polyester or polyether diols (macrodiols), preferred molecular weight 2,000. This process is more pronounced, the higher the molecular weight, for example 3,000 to 8,000, of the macrodiol.

In addition, polyether diols are more sparingly soluble in the usual solvents than polyester diols. Desolvation is particularly pronounced where polyether/-polyester diol mixtures are used. On account of the differences in solubility, mixtures such as these have a tendency to separate from the outset through microphase separation.

2. A higher than usual diisocyanate content (NCO content based on solids $\geqq 2.5\%$ by weight) is used for special applications where particularly high strengths and thermal stabilities are required. The resulting high content of polyurea segments in the elastane leads to reduced solubility and to an increase in the tendency of the elastane solution to become paste-like.
3. Since it is known that any increase in temperature leads to a reduction in solution viscosity, highly concentrated elastane solutions are often stored at elevated temperatures, for example 50° C. In many cases, however, this results in a drastic change in the viscosity of the elastane solution after only 1 to 2 days which is often attributable to an increase in molecular weight. It is assumed that this is mainly caused by aminolysis of the terminal groups, in which the secondary monoamines or their reaction products (for chain termination) are displaced from the urea bonds by primary terminal amino groups (from excess diamine chain-extending agents, such as ethylene diamine) and lead to a particularly large increase in viscosity. This endgroup displacement reaction is important particularly at substantially equivalent concentrations of secondary and primary amino groups.
4. By contrast, prolonged heating of elastane solutions or pastes, for example 2 to 5 hours at 80°-120° C., generally leads to a reduction in molecular weight, as reflected in a reduction of the $\eta_{rel}$ value of the polymer with increasing intensity of heating.

However, this reduction in molecular weight is difficult to control, involves high energy consumption and often leads to elastane solutions which can only be spun with numerous spinning defects, if at all!

If the polyaddition (chain extension) is carried out in the polar organic solvents normally used for this purpose, especially chain extension with ethylene diamine, solubility decreases by increasing molecular weight, so that paste formation is likely to occur. In the event of discontinuous operation, therefore, the polyaddition reaction is allowed to take place to a predetermined viscosity and/or a monofunctional chain terminator, such as dibutyl amine, octyl amine, butanone oxime (Houben Weyl, Vol. E 20, Part 2, page 1642), but preferably diethyl amine (Ullmanns Encyclopedia of Industrial Chemistry, Vol. A 10, page 612), is added. In this way, a narrower molecular weight distribution is obtained at the same time.

In order to achieve adequate mixing of the aliphatic (di)amine mixture with the NCO prepolymer solution before the very rapid aliphatic amine/NCO reaction, carbon dioxide is added to the (di)amine mixture when the reaction is carried out discontinuously in order to reduce the reactivity of the amine end groups. The carbamate suspension formed then reacts with the NCO prepolymer at a greatly reduced rate with elimination of $CO_2$ (see DE-A 1 223 154 or DE-A 1 222 253). By contrast, in a process which does not use carbon dioxide, very rapid mixing is necessary and must be achieved with an appropriate apparatus.

The rapid mixing of two or more reactive liquids is known per se in polyurethane chemistry for carrying out polyaddition reactions of NCO preadducts with water, aliphatic diols or aromatic diamines. All the operations involved in the process, such as metering, mixing and filling of moldings, have to be largely complete before the beginning of the chemical reaction (pot life).

The key operation is the mixing of predetermined quantities of liquids. This may be done by batch mixing with mechanical stirrers or continuously by motor/stator dispersion machines and toothed mixers (see Kunststoff-handbunch, Vol. 7, Carl Hanser Verlag 1977). In addition, mixing with high-pressure mixers is standard practice in polyurethane technology (see H. Proksa, Kunststoffberater 3/1988; Hochdruckvermischung, Wegbereiter moderner PU-Technik). In this case, two reaction components are sprayed against one another under high pressure through nozzles in a small mixing chamber and are mixed by the intensive turbulence generated (see DE-A 2 344 135 and DE-A 1 157 386). The reaction times required for polyurethane reactions such as these are minimally of the order of seconds.

However, since the polyaddition reactions of NCO preadducts with the aliphatic diamines in elastane production take place considerably more quickly than with diols, water or aromatic diamines, (e.g. highly viscous reaction products are formed in milliseconds), mixers of the type in question are not suitable for the continuous chain extension of NCO prepolymers with diamines. The reaction takes place more quickly than the reaction components can be mixed unless the mixing time available can be considerably lengthened by addition of reaction-inhibiting additives, for example by the addition of dry ice ($CO_2$) to the diamine, so that the reaction takes place via the much slower reacting carbamate stage and/or is additionally decelerated by the lower temperature.

EP-A 399 266 describes a process for the production of highly concentrated fine-particle dispersions from melts of high-melting organic compounds, but not reaction mixtures, in which—to form a presuspension—a melt is introduced into a colder liquid phase at a temperature below the crystallization temperature and the pre-emulsion formed is finely dispersed in a following homogenizing nozzle. The apparatus used to form the dispersion is inter alia an emulsifying unit comprising a mixing nozzle and a following homogenizing nozzle.

The same also applies to simple mixing nozzles in a co-current reactor which are used for the production of aqueous polyurethane dispersions by mixing an NCO prepolymer with water, for example in accordance with EP-A 0 303 907.

However, dispersion units such as these are still too slow in their mixing times and are only suitable when the reaction time is more than 0.1 second.

Without deactivation, for example with carbon dioxide, polyadditions cannot be carried out with aliphatic or cycloaliphatic diamines or with diols accelerated in their reactivity by a catalyst or by an increase in the mixing temperature. Reaction solutions produced in this way contain specks and gels and are therefore unsuitable for subsequent processing (particularly uninterrupted spinning).

According, the problem addressed by the present invention was to provide a cost-reducing and ecologically safe process (use of less solvent and improvement of economy by high-speed spinning) for the production of highly concentrated spinning solutions, preferably elastane solutions having improved flow properties (improvement of spinnability by a lower solution viscosity with no change in the necessary molecular weights) and improved viscosity stability, despite prolonged storage of the spinning solutions, without any deterioration in the thermal and elastic behavior of the products obtained therefrom and a gel-free form of spinning solutions with increased linearity of the polymer.

As can be seen from the description and the Examples, these advantages have been achieved by the use of the mixing and homogenizing machine according to the invention (in the form of a multistage jet reactor) for the polyaddition reaction. Simple but extremely effective mixers with hardly any moving parts are used for this purpose. Those mixers must be designed appropriately for extremely fast reactions and preferably comprise several stages.

The present invention relates to a continuous process for the production of highly concentrated elastane spinning solutions having improved flow properties and high viscosity stability during intervals of pro-longed storage with no change in the typical thermal and elastic properties of the elastane fibers obtainable from these solutions—preferably obtainable from correspondingly prepared segmented polyurethane ureas with certain monoamines and/or monoisocyanates as chain terminators.

Highly concentrated elastane spinning solutions based on polyurethane ureas with a solids content of up to 40% by weight can readily be obtained by the process according to the invention. These solutions show excellent solubility and viscosity stability, despite a higher percentage of hard segments, achieved for example through a higher percentage diisocyanate content, and a surprising reduction in the viscosity of the elastane spinning solution at the same polymer concentration.

It has now surprisingly been found that homogeneous, highly concentrated spinning solutions of excellent viscosity stability coupled with excellent flow properties and hence improved spinnability can be obtained both from polyester or polyether diols and in particular from mixtures of polyester and polyether diols by the process according to the invention providing the mixing and homogenizing machine (multistage jet reactor) is used continuously in the chain-extending stage (polyaddition). By virtue of the extremely rapid mixing effect obtained during the reaction, there is no longer any need to use carbon dioxide, for example, as a reaction inhibitor.

BRIEF DESCRIPTION OF THE DRAWINGS

The invention is described in more detail in the following with reference to the accompanying drawings, wherein.

Figure 1A:
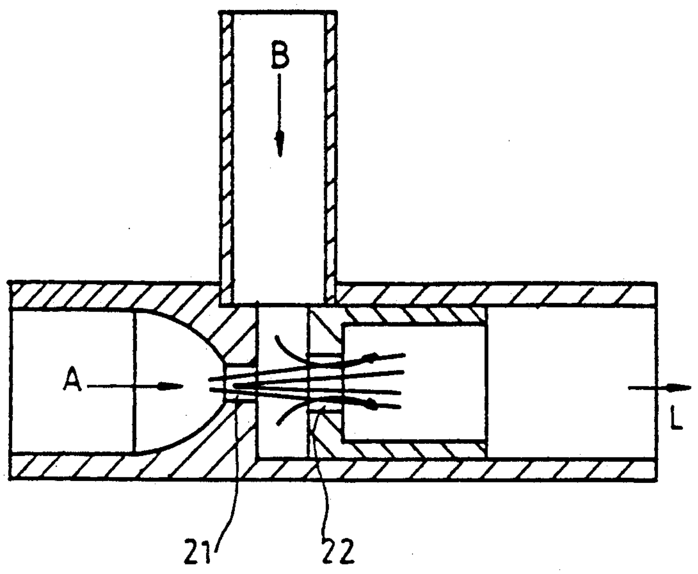
FIG. 1*a* is a section through a jet reactor with short residence times of the reaction mixture in the mixing chamber.
Figure 1B:
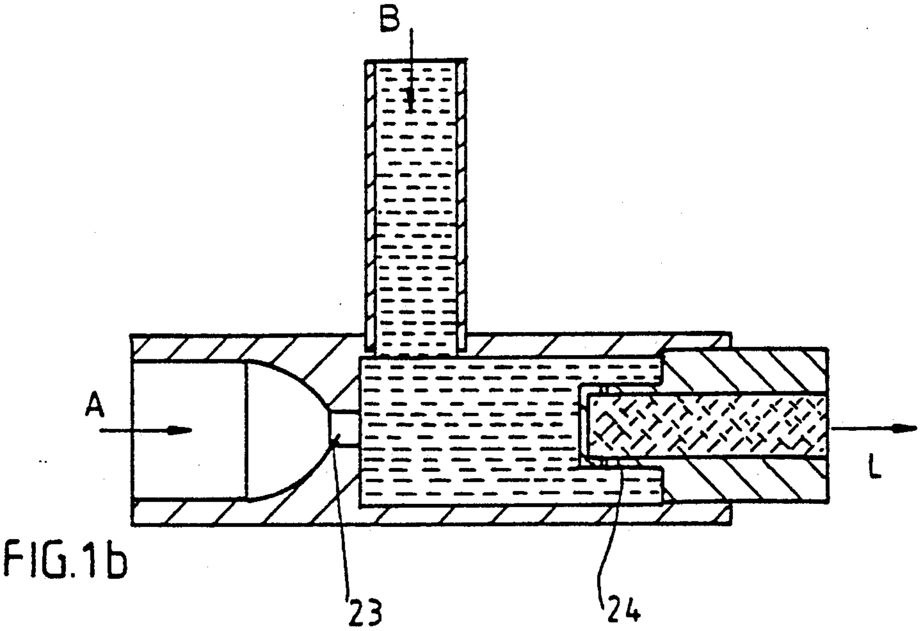
FIG. 1*b* is a section through a known jet reactor with a long residence time of the reaction mixture (>>100 ms) in the mixing chamber.
Figure 2:
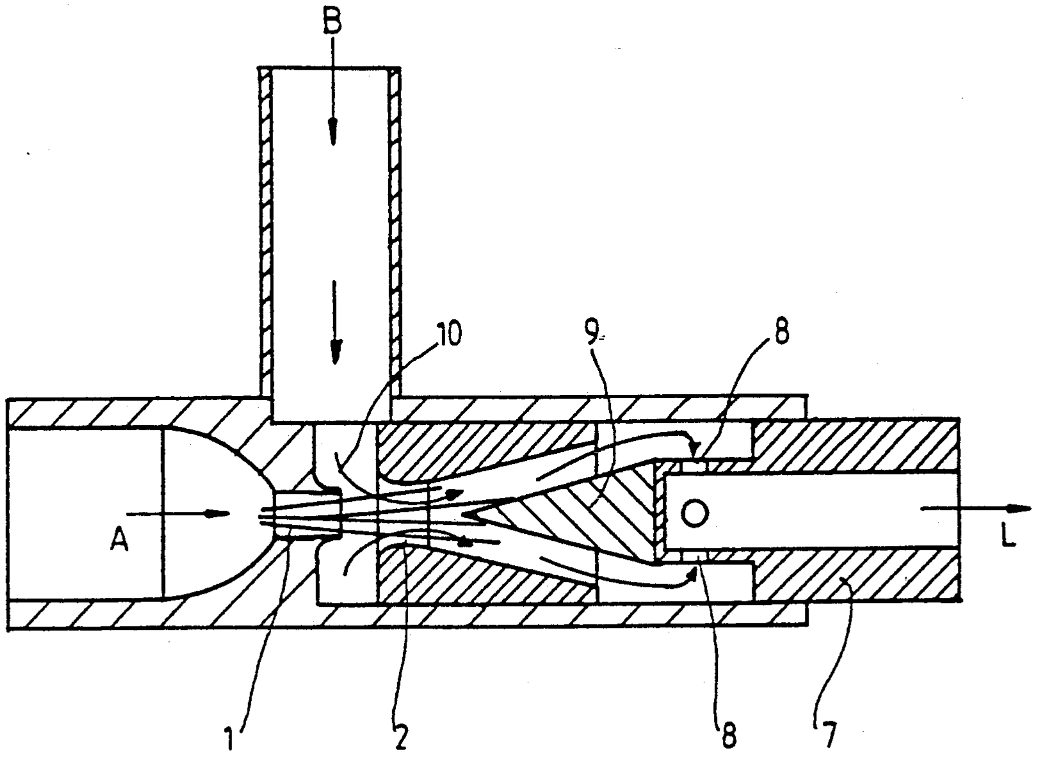
FIG. 2 is a diagrammatic section through a multistage jet reactor according to the invention.

The multistage jet reactor according to the invention enables highly reactive components to be mixed with one another faster than the reaction takes place (for example ≦10 ms) (FIG. 2). However, the known arrangement (see FIG. 1*b*) is unsuitable because the components are mixed too slowly (the residence time of the reaction mixture being >100 ms). As can be seen from the drawing (FIG. 1*a*), the feed nozzle (21) and the mixing nozzle (22) have to be coupled very closely to one another to guarantee rapid optimal mixing and a reduction in back-mixing.

Figure 3:
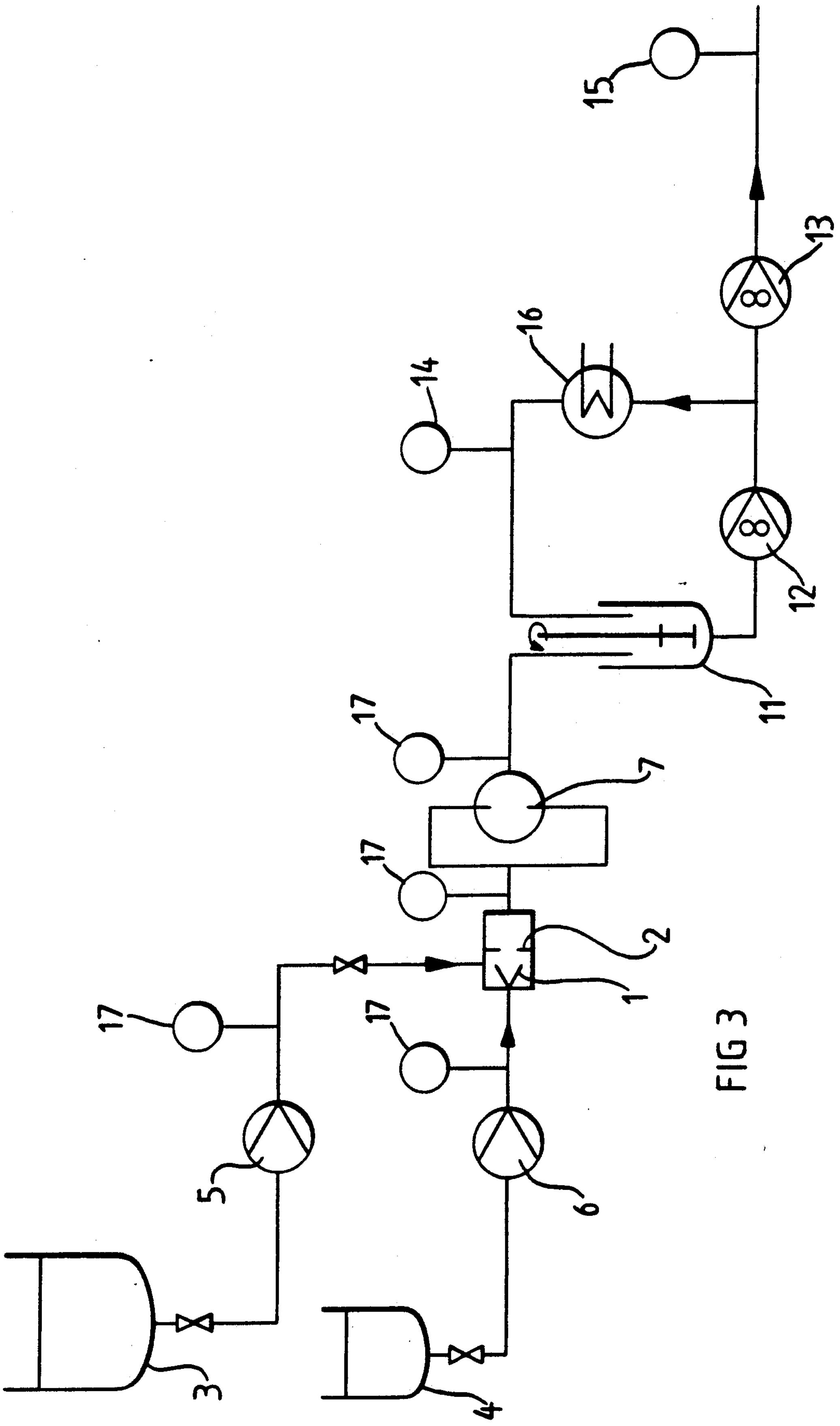
FIG. 3 is a flow chart of the process according to the invention for the production of the spinning solutions.

FIG. 3 shows the flow chart of the process according to the invention essentially for the continuous chain extension of polyurethane urea from NCO prepolymer solution and (cyclo)aliphatic diamines. The two streams, for example the NCO prepolymer solution (B) and the aliphatic diamine solution (A), are continuously introduced into the short-time mixing and homogenizing machine according to the invention shown in FIG. 2 (jet reactor) from the mixing tanks 3 and 4 by metering pumps 5 and 6. The mixture of the amine solution (chain extender, chain terminator and solvent) and the mixture of the NCO prepolymer solution (NCO prepolymer and solvent) may be weighed into the receiving media or may even be continuously prepared by metering pumps.

The multistage jet reactor (see, for example, FIG. 2) consists of various nozzles arranged in tandem, namely the feed nozzle 1, the mixing nozzle 2 and the homogenizing nozzle 7 with the bores 8 and, in a preferred embodiment, the displacer 9. The feed nozzle and the mixing nozzle are arranged immediately one behind the other so that the residence time required to obtain complete mixing of the amine stream (A) with the prepolymer stream (B) is ≦10 ms and preferably between 0.1 and 5 ms. The two nozzles 1 and 2 are designed in such a way that an injector effect is obtained and back mixing in the region 10 between the two nozzles is avoided.

The injector is followed by the homogenizing nozzle 7 with its bores 8 which again intensively homogenizes the already reacting reaction mixture. To ensure that mixing takes place at a low viscosity, the space between the mixing nozzle and the homogenizing nozzle is minimized by a displacer 9.

One of the possible embodiments is shown in FIG. 2.

The preferred embodiment of the process is described in more detail in the following with reference to FIG. 3:

Immediately behind the actual multistage jet reactor, the reaction solution enters the intermediate buffer tank 11 (FIG. 3) the function of which is to separate the jet reactor with its preceding metering pumps hydraulically from the following pipe system with the discharge pumps 12 and 13. This prevents back-pulses from being transmitted to the metering pumps 5 and 6 where they can cause variations in the micrometering region. Direct introduction into a spinning tank would also be possible.

The course of the reaction can be monitored by direct pressure measurement in the jet reactor, for example between the mixing nozzle 2 and the homogenizing nozzle 8.

The degree of polymerization of the polymer solutions can be monitored by the viscosity measuring instruments 14 and 15. Since the reaction in the intermediate buffer tank 11 may not be entirely complete so that it is difficult to use viscosity as a controlled variable for controlling the formulation, the buffer tank 11 is preferably equipped with a pump circuit and, in a particularly preferred embodiment, with a heat exchanger 16. So-called KSM heat exchangers (the heating and cooling coil is formed as a static mixer in a tube) are particularly suitable as the heat exchanger 16. A complete reaction is achieved in this region by heating to around 50° to 60° C., so that viscosity stability can be achieved by controlling the metering pumps 5 and 6 on the basis of the viscosity measurement 14. Other possible parameters for controlling viscosity include the continuous or gravimetric weighing in of the amine tank via the ratio of chain extender to chain terminator or through the selected amine excess via the terminal NCO group content. The pressure can be monitored by pressure gauges 17 at various points of the reactor.

The advantages of the process lie in the high throughputs achieved in the jet reactor, the uniform product quality (for example in regard to molecular weight distribution), and the high product concentration. Because each part by volume of the reaction solution is mixed and hence reacted under exactly the same shearing and concentration condition, there is hardly any opportunity for side reactions (e.g. crosslinking) to take place.

The segmented polyurethane urea elastomers produced in accordance with the invention give clear, gel-free stable spinning solutions which may readily be spun by standard wet spinning processes and, in particular, by dry spinning, even at high solids concentrations (for example 30 to 40% by weight). The preferably highly concentrated spinning solutions produced in accordance with the invention show excellent viscosity stability both at 25° C. and at 50° C. over storage times of up to at least 5 days and longer (for example even at high concentrations).

Surprisingly, the spinning solutions produced in accordance with the invention have a lower viscosity for a predetermined solids concentration than elastomer solutions produced by discontinuous polyaddition processes. It is assumed that a linear polymer structure is obtained which has a favorable effect, not only in regard to productivity, but also in regard to better spinning behavior of the elastane solutions.

Accordingly, through the use of the multistage jet reactor according to the invention as a mixing and homogenizing machine, preferably with a following intermediate buffer tank, pump circuit and heat exchanger, the production process according to the invention enables elastomer filaments to be produced with little or no deterioration in the thermal and mechanical property profile of the elastane filaments. By utilizing such advantages as the improvement in solubility, the reduction in viscosity, enhanced viscosity stability, even in the event of prolonged storage at elevated temperature, and improved quality stability, a better quality elastane is achieved.

The present invention also relates to filaments or fibers produced from the spinning solutions according to the invention.

The elastane solutions according to the invention may also be used for the production of films tubing or coatings.

The polyurethane urea elastomers according to the invention may be produced by process steps known per se. Synthesis by the NCO prepolymer process has proved to be particularly successful. In the first process step, a relatively high molecular weight diol a) is reacted in a solvent or in the melt with diisocyanate c), optionally in the presence of low molecular weight diols b), to form an NCO prepolymer in such a way that the NCO prepolymer contains terminal NCO groups in a certain quantity.

Particularly suitable long-chain, relatively high molecular weight dihydroxy compounds a) (also called macrodiols) are polyester diols and polyether diols. These diols generally have molecular weights of 1,000 to 8,000 and preferably 1,500 to 4,000.

Suitable polyester diols are, for example, dicarboxylic acid polyesters of aliphatic dicarboxylic acids which may contain both several diols and several dicarboxylic acids or hydroxycarboxylic acids. Adipic acid mixed esters of adipic acid, 1,6-hexanediol and neopentyl glycol, adipic acid, 1,4-butanediol and neopentyl glycol or adipic acid, 1,4-butanediol, neopentyl glycol and 1,6-hexanediol are particularly suitable.

Particularly suitable long-chain polyether diols are polytetramethylene oxide diols or their copolyethers with other ether-forming compounds, such as ethylene oxide or propylene oxide. Mixtures of the compounds mentioned may also be used.

Other relatively high molecular weight diol compounds (macrodiols), for example dihydroxylactone esters or dihydroxypolycarbonates as known from the prior art, may also be used in the same way as other relatively high molecular weight diols known from the prior art, including diols linked to diisocyanates (for example in a molar OH:NCO ratio of 2:1 to 5:4).

Low molecular weight diols b) are, for example, ethylene glycol, 1,2-butanediol, 1,4-butanediol, 1,4- and/or 1,3-cyclohexane dimethanol, N,N-bis-(β-hydroxypropyl)-methyl amine, N,N'-bis-(β-hydroxyethyl)-piperazine, N,N-dimethyl-N',N'-hydroxyethyl hydrazine and other compounds belonging to these classes.

The diisocyanates c) may be any of the usual aromatic diisocyanates. They are optionally used in combination with (relatively small amounts of) (cyclo)aliphatic diisocyanates, although the (cyclo)aliphatic diisocyanates may also be used on their own. Particularly useful results are obtained with 4,4'-diphenyl methane diisocyanate or corresponding isomer mixtures with small quantities of 2,4'- and/or 2,2'-isomers and with toluene diisocyanate (TDI). It is of course possible to use mixtures of aromatic diisocyanates. Other suitable mixture components or individual components are, for example, (cyclo)aliphatic diisocyanates more particularly 1,6-hexamethylene diisocyanate, 1,8-octamethylene diisocyanate, 2,3-methyl-1,6-hexamethylene diisocyanate or 2,4-diisocyanato-1-methyl cyclohexane and the 4,4'-dicyclohexyl methane, 4,4'-dicyclohexyl alkylidene, 4,4-dicyclohexyl ether diisocyanates or isophorone diisocyanate in the form of its various stereoisomers or stereoisomer mixtures.

In the synthesis of the segmented elastomers by the NCO prepolymer process, the macrodiols are reacted in the melt or in a solvent with excess molar quantities of diisocyanates c) by way of the diols (a+b) in such a way that the reaction product contains terminal isocyanate groups. The OH:NCO ratios are selected between 1:1.4 and 1:4.0 and preferably between 1:1.6 and 1:3.8, so that NCO prepolymers having an NCO content of 1.4 to about 4.5% by weight and preferably 1.8 to 4.0% by weight NCO are formed. The OH:NCO ratio has to be selected within the predetermined limits, depending on the molecular weight of the macrodiol, in such a way that the NCO content of the NCO prepolymer is in the desired range.

Suitable catalysts for the production of the NCO prepolymer are Lewis acid catalysts, such as tin salts, or for example organotin compounds, such as organotin carboxylates or halides, dibutyl tin dilaurate, inorganic salts of organic acids, for example tin octoate, tin stearate, tin acetate, lead octoate, insertion catalysts, such as organotin alcoholate, β-dicarbonyl compounds, oxides, mercaptides, sulfides, organoamine tin and phosphine tin compounds: Lewis base catalysts, such as tertiary amines, phosphines, pyridines, as known in principle for the production of polyurethanes, are also suitable as catalysts. Dibutyl tin dilaurate (Desmorapid® Z, a product of Bayer AG) or diazabicyclooctane (DABCO®) are preferably used. In general, catalysts are not used, although small quantities of deactivators for alkali acids are often used.

Suitable solvents for the prepolymerization reaction-where it is carried out in the presence of solvent-are chlorobenzene, N-methyl pyrrolidone and dimethyl sulfoxide, the highly polar amide solvents also used generally as spinning solvents, namely dimethyl formamide and dimethyl acetamide, being most particularly preferred.

To synthesize the segmented polyurethane ureas, the desired urea groups are introduced into the macromolecules by a chain-extending reaction of the NCO prepolymers with diamines. The NCO prepolymers (also called macrodiisocyanates) synthesized in the NCO prepolymer stage are reacted in highly polar solvents with chain-extending agents f), preferably aliphatic diamines, and chain terminators/blocking agents (secondary monoamines) g) by the process according to the invention using the multistage mixing and homogenizing machine according to the invention.

Preferred diamines f) are linear or branched diamines, for example 1,2-propylene diamine, 1,4-diaminobutane, 1,6-diaminohexane, 1,3-diaminocyclohexane or even 1,3-diamino-2,2-dimethyl propane. However, ethylene diamine is preferably used as the sole or predominant chain-extending agent.

Cycloaliphatic diamines, for example 1,3-diaminocyclohexane, may also be used in quantities of <50 mol-% as co-chain extenders.

Secondary amines, such as piperazine, N-methyl ethylene diamine or N,N'-dimethyl ethylene diamine, may also be used as co-diamines, although this is less preferred.

The chain-extending reaction preferably takes place in solution using highly polar solvents, such as dimethyl sulfoxide, N-methyl pyrrolidone, but preferably dimethyl formamide and especially dimethyl acetamide.

The viscosity of the elastomer solution required for the preferred dry spinning process is generally in the range from 10 to 350 Pa.s, as measured at 50° C. and at a shear rate of 23 $s^{-1}$; the concentration of the spinning solution may be between 18 and 34% by weight. The elastomer solutions produced by the process according to the invention may have solids concentrations of up to 40% and higher, in which case the viscosity of the elastomer solution is in the range from 100 to 250 Pa.s at 50° C. (shear rate 23 $s^{-1}$).

In the dry spinning process, the spinning solutions-optionally heated to around 120° C.—with viscosities of at least 30 Pa.s at 50° C. may be spun through nozzles into an approximately 4 to 8 meters long spinning tube heated to around 150°-250° C. into which air heated to around 150° to 350° C. or inert gases, such as nitrogen or steam are injected.

The solutions produced in accordance with the invention have a viscosity stability of at least ±20% over at least 5 days and preferably at least 7 days and are distinctly more favorable by comparison with the discontinuous process.

By using a small quantity of a monofunctional chain terminator during the chain-extending reaction, the desired molecular weight can readily be controlled.

Surprisingly, spinning solutions from the invented process show a reduced viscosity as compared to solution prepared with standard processes with the same composition, so that solutions of relatively high concentration may be used for spinning.

Additives i) performing various functions may also be added in effective quantities to the elastomer solutions prepared in accordance with the invention. The additives i) include, for example, antioxidants, light stabilizers, UV absorbers, dyes, pigments, coloring additives (for example oligomers or polymers containing tertiary amines), antistatic agents, DMF-soluble silicone oils, adhesive additives, such as magnesium, calcium, lithium, zinc and aluminium salts of long-chain carboxylic acids, such as stearates, palmitates, or dimer fatty acids or mixtures of these salts or even additions of fine-particle zinc oxides which may contain up to 15% by weight other oxides, for example magnesium oxide or calcium oxide, or carbonates, for example calcium or magnesium carbonates. Zinc oxides in conjunction with alkaline earth metal oxides or carbonates as additives provide ether and polyester elastomer filaments with excellent resistance to chlorine-containing water (detergents; swimming pools; bleaches) without having to meet stringent requirements in regard to purity, for example in regard to the zinc oxide or trace sulfur content.

The elastomer solutions obtained by the process according to the invention may be spun into elastomer filaments by the processes mentioned above and may also be processed to film coatings or similar sheet-form materials. This may be done by drying or coagulation.

The elastomer solutions according to the invention show an unusual combination of excellent solubility and viscosity stability, even at high temperatures and over prolonged periods of storage.

Methods of measurement

The variables mentioned in the Examples were determined as follows:

the intrinsic viscosity ($^{n}i$) of the elastomers was determined on a dilute solution in dimethyl acetamide (concentration 0.5 g/100 ml) at 30° C. by measurement of the relative viscosity $^{n}r$ against the pure solvent and converted in accordance with the following formula:

$$n_R = \frac{t1}{t0}$$

$t_1$: throughflow time (seconds) of the polymer solution $t_0$: throughglow time (seconds) of the pure solvent $$n_i = \frac{\ln_r{}^n}{c}.$$

Fineness-related strength was determined in accordance with DIN 53 815 (cN/dtex). The maximum tensile force elongation (in %) was also determined in accordance with DIN 53 815. The modulus at 100% and 300% initial elongation was determined at an elongation rate of $4\times10^{-3}$ meters per second in cN/dtex. The residual elongation was determined after 5×300% elongation and a recovery time of 60 seconds. The heat distortion temperature (HDT), hot break time (HBT) and reduction in tension in hot water (RTHW) were measured by the methods described in Chemiefasern-/Textilindustrie, January 1978, No. 1/78, 28.180, pages 44 to 49. Corresponding particulars can also be found in DE-OS 25 42 500 (1975).

Spinning was carried out by dry spinning in accordance with the Examples under the following conditions:

| | |
|---|---|
| Spinning tube temperature | 200° C. |
| Air temperature | 220° C. |
| Airflow rate | 40 $m^3/h$ |
| Spinneret | 12 bores, diameter 0.3 mm |
| Spinning head temperature | 80° C. |
| Air twist nozzle | 0.6 bar |
| Take-off of godets 1, 2, 3 | 325/340/340 m/min. |

EXAMPLES

Example 1

NCO prepolymer solution for Examples 3, 4, 5, 7 and 8

25,000 g of a polyester diol, molecular weight $M_n$ 2,014, based on adipic acid, 1,6-hexanediol and neopentyl glycol (molar ratio of the diols 65:35) were mixed with 13,175 g dimethyl acetamide and 5,741 g diphenyl methane-4,4'-diisocyanate (Desmodur ® 44, a product of Bayer AG) were added to the resulting mixture. The mixture was then heated for 40 minutes to 50° C. so that the NCO prepolymer had an NCO content of 2.60%. The solids content of the NCO prepolymer solution was 70%.

Example 2

NCO prepolymer solution for Examples 6 and 9

18,000 g of a polyester diol (based on adipic acid, 1,6-hexanediol, 1,4-butanediol, neopentyl glycol; molar ratio of the diols 64:17:19), molecular weight $M_n$ 3,313, and 7,714 g of a polytetramethylene etherdiol (Terathane®2,000, $M_n$ 2,066, a product of DuPont) were mixed with 12,857 g dimethyl acetamide and 4,286 g diphenylmethane-4,4'-diisocyanate were added to the resulting mixture. The mixture was then heated for 60 minutes to 50° C. so that the NCO prepolymer had an NCO content of 2.14% (based on solids). The solids content of the NCO prepolymer solution was 70%.

Example 3

Comparison Example-carbamate method-with Examples 7 and 8

60 g $CO_2$ were added to a mixture of 26 g ethylene diamine, 1.6 g diethyl amine and 4,463 g dimethyl acetamide. 2,000 g of the NCO prepolymer solution of Example 1 were added to this freshly prepared carbamate suspension with intensive stirring over a period of 15 minutes. A clear solution having an elastomer solids content of 22% and a solution viscosity of 39 Pa.s/20° C. was obtained. The solution had an intrinsic viscosity of 1.06 dl/g. Based on polyurethane solids, 0.3% by weight Mg stearate, 1% by weight Cyanox® 1790 (American Cyanamid, USA), 0.5% by weight Tinuvin 622 (Ciba Geigy), 7 ppm Makrolex®—Violett B (Bayer AG), 0.5% by weight of the polyether siloxane Silvet® L7607 (a polyether/polydimethyl siloxane copolymer of Union Carbide Corp., USA) were then added to the viscous elastomer solution. 3,000 g of this polymer solution were spun by dry spinning.

The solution was dry-spun through a 12-bore spinneret with a bore diameter of 0.3 mm. Temperature in the spinning tube 200° C., air temperature 220° C., take-off rate 340 m/min. using an air twister. The textile data are set out in Table 1 while the long-term viscosity behavior is summarized in Table 2.

Example 4

Comparison with Example 7

60 g $CO_2$ were added to a mixture of 26 g ethylene diamine, 2732 g dimethyl acetamide and 1.6 g diethyl amine. 2,000 g of the NCO prepolymer solution according to Example 1 were added to this carbamate suspension with stirring over a period of 15 minutes. A clear elastomer solution having an elastomer solids content of 30% by weight and a solution viscosity of 121 Pa.s/50° C. was obtained. The solution had an intrinsic viscosity of 1.24 dl/g. Additives were then incorporated in the viscous elastomer solution in the same way as described in Example 3. The solution was spun by dry spinning as in Example 3. The data of the filaments obtained are set out in Table 1 while the long-term viscosity behavior is summarized in Table 2.

Example 5

Comparison with Example 8

60 g $CO_2$ were added to a mixture of 26 g ethylene diamine, 1.6 g diethyl amine and 2,052 g dimethyl acetamide. 2,000 g of the NCO prepolymer solution of Example 1 were added to this carbamate suspension with stirring over a period of 15 minutes. A clear elastomer solution having an elastomer solids content of 35% by weight and a solution viscosity of 158 Pa.s/50° C. was obtained. The solution had an intrinsic viscosity of 0.99 dl/g. Additives were incorporated in the viscous elastomer solution in the same way as described in Example 3. The solution was spun by dry spinning as in Example 3. The data of the filaments obtained are set out in Table 1 while the long-term viscosity behavior is summarized in Table 2.

Example 6

Comparison with Example 9

60 g $CO_2$ were added to a mixture of 21.7 g ethylene diamine, 4445 g dimethyl acetamide and 1.4 g diethyl amine. 2,000 g of the NCO prepolymer solution of Example 2 were added to the carbamate suspension over a period of 15 minutes. A clear elastomer solution having an elastomer solids content of 22% by weight and a solution viscosity of 61 Pa.s/20° C. was obtained. The solution had an intrinsic viscosity of 1.38 dl/g. The additives described in Example 3 were incorporated in the viscous elastomer solution which was then spun by dry spinning. The data of the filaments obtained are set out Table 1.

Example 7

An elastomer solution having a solids content of 30% by weight was prepared in the installation shown in FIG. 3 using the multistage jet reactor shown in FIG. 2.

53.5 Parts of the NCO prepolymer solution prepared in accordance with Example 1 diluted to 39.2% by weight were introduced into tank 3 and 17.8 parts amine solution into tank 4. The amine solution had the following composition:

394.8 parts ethylene diamine
24.6 parts diethyl amine
17,430.0 parts dimethyl acetamide.

The diameters of the feed nozzle 1 and the mixing nozzle 2 (see FIG. 2) were 0.5 mm and 0.75 mm, respectively. The diameter of the bores in the homogenizing nozzle was 0.75 mm. The NCO prepolymer solution was delivered to the jet reactor by the metering pump 5 under a pressure of 25 bar at a rate of 45 kg/h while the amine solution was delivered to the jet reactor by the metering pump 6 under a pressure of 28 bar at a rate of 15 kg/h. The residence time in the mixing zone was approx. 0.5 to 5 ms. The reaction solution then entered the after-reaction section in which it was heated to 50° C. by the heat exchanger 16 for the after-reaction. The gear pump 12 pumped the solution at a rate of 90 kg/h and delivered 30 kg/h into the heat exchanger and 60 kg/h from the after-reaction section. The clear, homogeneous and gel-free elastomer solution obtained was removed from the installation by the discharge pump 13. The elastomer solution had an elastomer solids content of 30% by weight and a solution viscosity of only 56 Pa.s/50° C. Its intrinsic viscosity was 1.13 dl/g. The additives described in Example 3 were incorporated in the elastomer solution which was then spun by dry spinning. The textile data of the fibers are set out in Table 1 while the long-term viscosity behavior is summarized in Table 2.

Examples 8 and 9

Examples 8 and 9 were carried out in the same way as in Example 7 in the same installation and under the same reaction conditions. The composition of the starting components and also the viscosity and intrinsic viscosity of the elastomer solutions obtained are shown in Table 3.

TABLE 3

| | Example 8 | Example 9 |
|---|---|---|
| Initial charge, tank 3: | of Example 1 | of Example 2 |
| NCO prepolymer with a prepolymer concentration of | 45.75% | 28.86% |
| Initial charge, tank 3: | 45.9 parts | 72.8 parts |
| Initial charge, tank 4: | 15.3 parts | 24.3 parts |
| Composition of charge Tank 4: | | |
| Ethylene diamine | 394.8 parts | 325.8 parts |
| Diethyl amine | 24.6 parts | 20.3 parts |
| Dimethyl acetamide | 14,880.0 parts | 23,910.8 parts |
| The elastomer solution showed the following characteristics: | | |
| Solids content | 35% | 22% |
| Viscosity | 70 Pa · s/50° C. | 90 Pa · s/20° C. |
| Intrinsic viscosity (see measuring procedure) | 1.01 dl/g | 1.32 dl/g |

Additives were introduced into the elastomer solutions obtained in the same way as described in Example 3. The solutions were then dry spun in the same way as in Example 3. The textile data are set out in Table 1 while the long-term viscosity behavior is summarized in Table 2. It is pointed out in particular that the process according to the invention gives highly elastic elastane filaments which is a particular advantage for a number of applications.

TABLE 1

| | | | textile data | | | | | | | | |
|---|---|---|---|---|---|---|---|---|---|---|---|
| Example | Solids content of spinning solution | Chain terminator | Fineness (dtex) | FS- (cN/dtex) | FS-act. (cN/dtex) | MTFE (%) | ε (%) | R 100 (cN/dtex) | R 300 (cN/dtex) | HDT (°C.) | ηi |
| 3 | 22% | DEA | 154 | 0.86 | 4.61 | 436 | 21 | 0.064 | 0.264 | 176 | 1.06 |
| 7 | 30% | DEA | 157 | 1.06 | 5.76 | 444 | 20 | 0.059 | 0.316 | 179 | 1.13 |
| 8 | 35%. | DEA | 152 | 1.06 | 6.31 | 498 | 23 | 0.056 | 0.199 | 172 | 1.01 |
| 6 | 22% | DEA | 160 | 0.93 | 6.57 | 603 | 18 | 0.067 | 0.138 | 176 | 1.38 |
| 9 | 22% | DEA | 147 | 0.95 | 6.68 | 601 | 13 | 0.040 | 0.101 | 168 | 1.32 |

Examples 4 and 5 could not be spun because the solutions had turned to paste.
FS: Fineness-related strength
FS-act.: Fineness-related strength based on starting denier
MTFE: Maximum tensile force elongation (breaking elongation)
ε: Residual elongation after 5 × 300% elongation
R 100/R 300: Force Absorption at 100% and 300% elongation
HBT: Hot break time; time at which the filament breaks at 200° C. under defined elongation
HDT: Heat distortion temperature; temperature at which the filament breaks under a defined load
ηi: ηintrinsic = viscosity

TABLE 2

Long-term behavior of the elastomer solutions of Examples 3, 4, 5, 7, 8 at 25° C.

| | Solution viscosities [Pa · s (50° C.; in | | | Example 3: 20° C.)] |
|---|---|---|---|---|
| Example | 1st | 2nd | 5th day | Δ |
| 3 (Comp.) | 38 | 36 | 36 | −8% |
| 4 (Comp.) | 121 | 159 | Paste | |
| 5 (Comp.) | 158 | Paste | | |
| 7 (Invention) | 56 | 59 | 64 | +14% |
| 8 (Invention) | 70 | n.d. | 75 | +7% |

Δ: Total change in solution viscosity in % in relation to the starting viscosity
n.d.: Not determined Example 7a Use of a long-time nozzle according to FIG. 1*b* (comparison)

Using the installation shown in FIG. 3 and the jet reactor shown in FIG. 1*b*, an attempt was made to prepare an elastomer solution having a solids content of 30% by weight and the same formulation as in Example 7.

The diameter of the feed nozzle 23 was 0.4 mm. The mixing nozzle 24 had two 0.6 mm diameter bores. The NCO prepolymer was delivered at a rate of 45 kg/h under a pressure of 30 bar while the amine solution was delivered at a rate of 15 kg/h under a pressure of 35 bar. The residence time in the mixing zone was approximately 100 ms. After a short period of operation, uncontrolled variations in pressure up to >40 bar occurred as a result of gel-like thickening of the issuing reaction solution, so that the test had to be terminated.

Example 7b

Use of a short-time nozzle according to FIG. 1*a* (comparison)

Using the installation shown in FIG. 3 and the jet reactor shown in FIG. 1*a*, an attempt was made to prepare an elastomer solution having a solids content of 30% by weight and the same formulation as in Example 7. The diameter of the feed nozzle 21 was 0.4 mm while the mixing nozzle 22 had a 0.6 mm diameter bore. The NCO prepolymer was delivered at a rate of 45 kg/h under a pressure of 20 bar while the amine solution was delivered at a rate of 15 kg/h under a pressure of 25 bar. The residence time in the mixing zone was approximately 5 ms.

The spinning solution obtained contained microgels which caused repeated fiber breakage during subsequent dry spinning of the spinning solution.

We claim:

1. A continuous process for the production of highly concentrated elastane spinning solutions having improved flow properties and high viscosity stability from rapidly reacting polyaddition components, wherein the reaction components are continuously introduced from mixing tanks into a multistage jet reactor consisting of a mixing chamber (10) with a feed nozzle (1), a mixing nozzle (2) and a homogenizing nozzle (7), which are arranged immediately one behind the other, the reaction components are mixed together in the mixing nozzle (2) of the reactor in up to 10 ms in the first stage of the multistage jet reactor, the reacting mixture is homogenized in a homogenizing nozzle (7) in a second stage and is then reacted to completion in a following reactor.

2. A process as claimed in claim 1, wherein the reaction components are NCO prepolymers and cycloaliphatic or aliphatic diamines and the diamines are delivered to the mixing nozzle (2) through a feed n-ozzle (1).

3. A process as claimed in claim 2, wherein the NCO prepolymers are prepared from a) polyester or polyether diols or mixtures of polyester and polyether diols having a molecular weight of 1000 to 8000, diisocyanate c) and with or without additionally low molecular weight diols b).

4. A process as claimed in claim 2, wherein ethylene diamine is used as the diamine.

5. A process as claimed in claim 1, wherein immediately after the jet reactor, the reaction solution is delivered to an intermediate buffer tank (11).

6. A process as claimed in claim 5, wherein a pump circuit with a heat exchanger (16) is connected to the intermediate buffer tank (11).

7. A process as claimed in claim 6, wherein the viscosity in the pump circuit is kept constant by measurement of the viscosity in the pump circuit and using the result of the measurement as a controlled variable for the introduction of the reaction components.

8. A process as claimed in claim 1, wherein the residence time of the reactants in the reactor up to end of the mixing zone (2) is 0.1 to 5 ms.

9. Gel-free polyurethane urea elastomer spinning solutions having a viscosity of 10 to 350 Pa.s, as measured at 50° C. and at a shear rate of 23 $s^{-1}$, characterized in that they have a solids concentration of greater than 30% by weight and a viscosity stability of at least ±20% after storage for at least 5 days at 50° C.

10. A multistage jet reactor consisting of a mixing chamber (10) with a feed nozzle (1), a mixing nozzle (2) and a homogenizing nozzle (7), which are arranged immediately one behind the other, characterized in that the residence time of the reaction components, which flow into the reactor and one of which is delivered via the feed nozzle (1) while other reactants are delivered via the mixing chamber (10), up to complete mixing at the end of the mixing nozzle (2) is less than 100 ms and in that back mixing is avoided in the mixing chamber (10) between the feed nozzle (1) and the mixing nozzle (2).

11. A multistage jet reactor as claimed in claim 10, characterized in that the feed nozzle (1) and the mixing nozzle (2) are arranged axially one behind the other and the mixing nozzle (2) is adjoined before the homogenizing nozzle (7) by a displacer (9) which guides the reaction mixtures to the bores (8) of the homogenizing nozzle (7).

12. A multistage jet reactor as claimed in claim 1, characterized in that the residence time of the reaction components in the mixing chamber (10) up to the end of the mixing nozzle (2) is ≦10 ms.

13. A multistage jet reactor as claimed in claim 12, characterized in that the residence time of the reaction components is between 0.1 and 5 ms.

* * * * *